(12) United States Patent
Han

(10) Patent No.: US 6,409,249 B1
(45) Date of Patent: Jun. 25, 2002

(54) AUTOMOBILE DOOR HANDLE

(75) Inventor: Kyung-Sik Han, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/679,942

(22) Filed: Oct. 4, 2000

(30) Foreign Application Priority Data

Dec. 31, 1999 (KR) .............................. 99-68305

(51) Int. Cl.⁷ .............................. B60N 3/02; B60J 5/02
(52) U.S. Cl. .................... 296/146.7; 296/152; 296/153; 296/189
(58) Field of Search ................................ 296/189, 149, 296/150, 152, 153, 146.7

(56) References Cited

U.S. PATENT DOCUMENTS

| | | | | |
|---|---|---|---|---|
| 2,325,292 A | * | 7/1943 | Westrope ................ | 296/146.7 |
| 5,181,759 A | * | 1/1993 | Doolittle ................. | 296/153 |
| 5,519,917 A | * | 5/1996 | Cordnonnier ............ | 16/110 |
| 5,529,370 A | * | 6/1996 | Veit ....................... | 296/146.7 |
| 5,531,499 A | * | 7/1996 | Vecchio et al. .......... | 296/146.7 |

* cited by examiner

Primary Examiner—Stephen T. Gordon
Assistant Examiner—Greg Blankenship
(74) Attorney, Agent, or Firm—Christie, Parker & Hale, LLP

(57) ABSTRACT

An automobile door handle adapted and constructed to break off when an automobile is laterally collided upon to prevent shock caused by the collision from being transmitted to passengers, thereby promoting passenger safety. The handle has a handle part and a boss part combined to the handle part and coupled to a door panel by way of a coupling, wherein the boss part is weakened to allow for breaking of the boss part when shock of more than a predetermined size is applied to the boss part.

4 Claims, 5 Drawing Sheets

AUTOMOBILE DOOR HANDLE

BACKGROUND OF THE INVENTION

1. Field of the Invention

The present invention relates to an automobile door handle and more particularly to an automobile door handle adapted and constructed to break off when an automobile is laterally crashed to prevent shock caused by collision from being transmitted to passengers, thereby promoting safety to the passengers.

2. Description of the Prior Art

Generally, a door hinged to the body of an automobile for passengers to get on and get off therethrough is provided to the automobile. The door 10 is manufactured by an outer panel and an inner panel mutually combined as illustrated in FIG. 1. The inner panel 11 is mounted with a trim member 12 as interior material whereas the trim member 12 is inwardly and protrusively provided with a handle 13 for a passenger to hold for opening and closing the door.

In other words, the handle 13 is integrally equipped with a boss part 14 protruded to each rear tip end portion thereof as illustrated in FIG. 1, and the boss part 14 is formed as a hollow cylinder with a through hole 14a.

Furthermore, the boss part 14 is inserted thereinto with a bolt 15 which passes the hole 14a to get coupled with a nut 16 at a rear panel of the inner panel 11, securing the handle 13 to the inner panel 11. At this time, between a tip end of the boss 14 and the inner panel 11 there is provided a predetermined length of spacer 17 for absorbing a gap between the inner panel 11 and the boss 14.

Meanwhile, when an automobile is laterally crashed and equipped with the handle 13 protruded toward the inner side of the door 10 thus described, shock transmitted to the body of the automobile is transferred to the inner panel 11 and simultaneously to the handle 13 secured thereto, where the handle 13 is pushed into the inside of the automobile by the shock and applies shock to a side of a passenger, aggravating the injury of the passenger.

Therefore, it is preferred to make the boss part 14 with material of less strength in consideration of passenger's safety when an automobile is hit at a side thereof while it is preferred to make the handle 13 with material of higher strength in order to firmly secure the handle 13 to the inner panel 11 of the door 10.

When the handle 13 is manufactured, above two points should be considered at the same time, which is impossible in reality, such that other countermeasures should be studied than the material of boss part 14.

SUMMARY OF THE INVENTION

The present invention is disclosed to solve the aforementioned problems and it is an object of the present invention to provide an automobile door handle constructed and designed to enable a boss part for securing a door handle to an inner panel to be broken off by the shock transmitted from a side collision, thereby preventing the shock generated by the side collision from being directly transmitted to a side of a passenger through the handle.

In accordance with the object of the present invention, there is provided an automobile door handle, the handle comprising:

a handle part;

a boss part combined to the handle part and again coupled to a door panel; and strength weakening means for weakening the structural strength of the boss part in order to break the boss part when shock of more than a predetermined size is applied to the boss part, wherein the strength weakening means comprises a notch formed at a predetermined portion lengthwise along the boss part decreasing the thickness of the boss part, and the boss part is formed with a plurality of slots extending lengthwise thereof, each formed at a predetermined space along a circumferential direction thereof.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF AN EXEMPLARY EMBODIMENT OF THE INVENTION

Now, preferred embodiment of the present invention will be described in detail with reference to the accompanying drawings.

Figure 1:
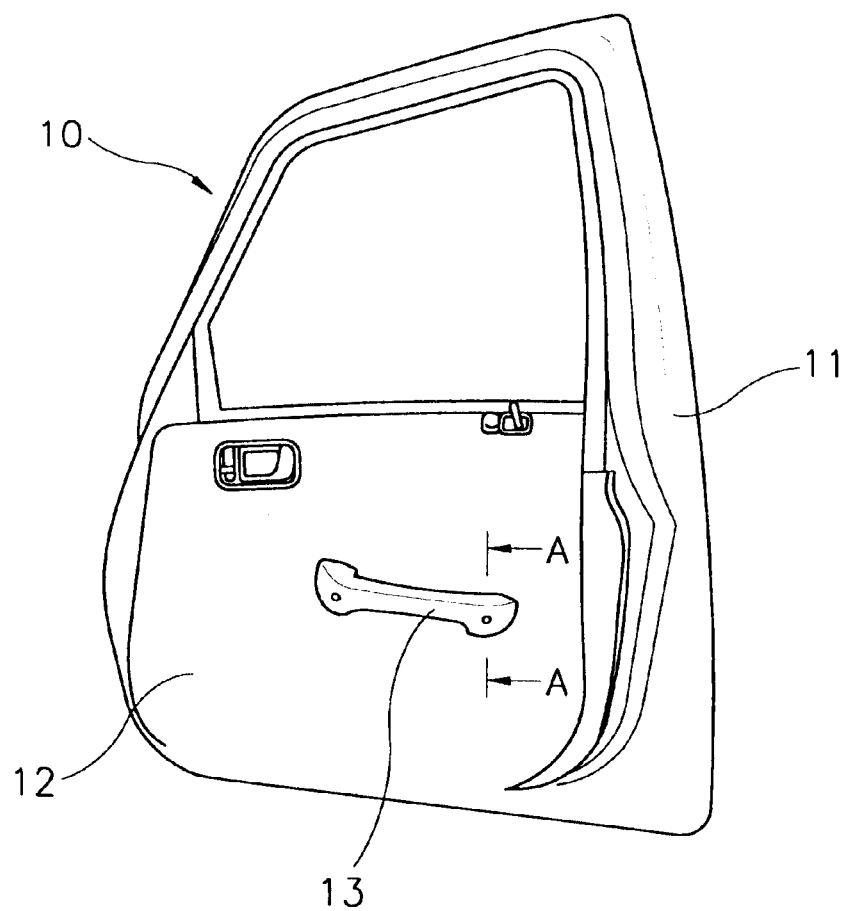
FIG. 1 is a perspective view for illustrating an automobile door according to the prior art.
Figure 2:
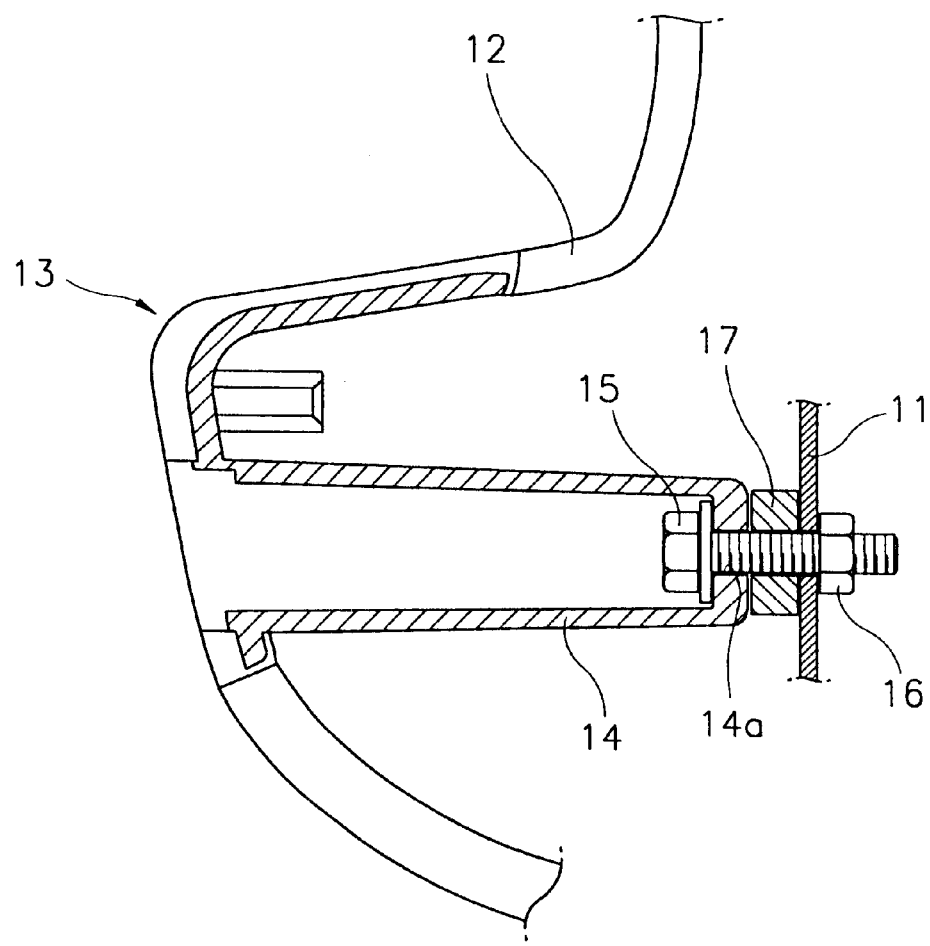
FIG. 2 is a sectional view taken along line A—A of FIG. 1 for illustrating a boss part of a handle attached to an inner panel of the door.
Figure 3:
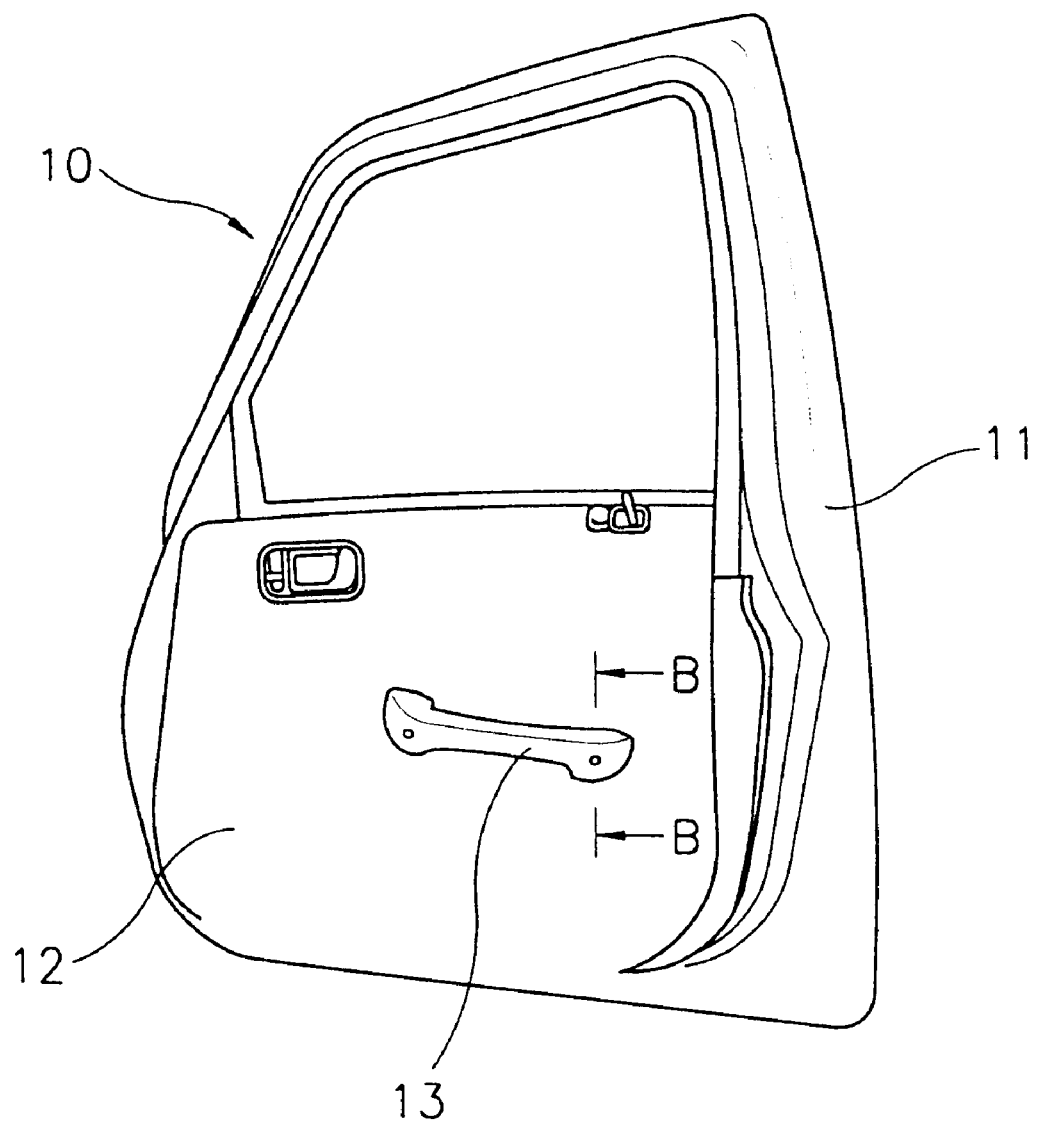
FIG. 3 is a perspective view for illustrating an automobile door according to a first embodiment of the present invention.
Figure 4:
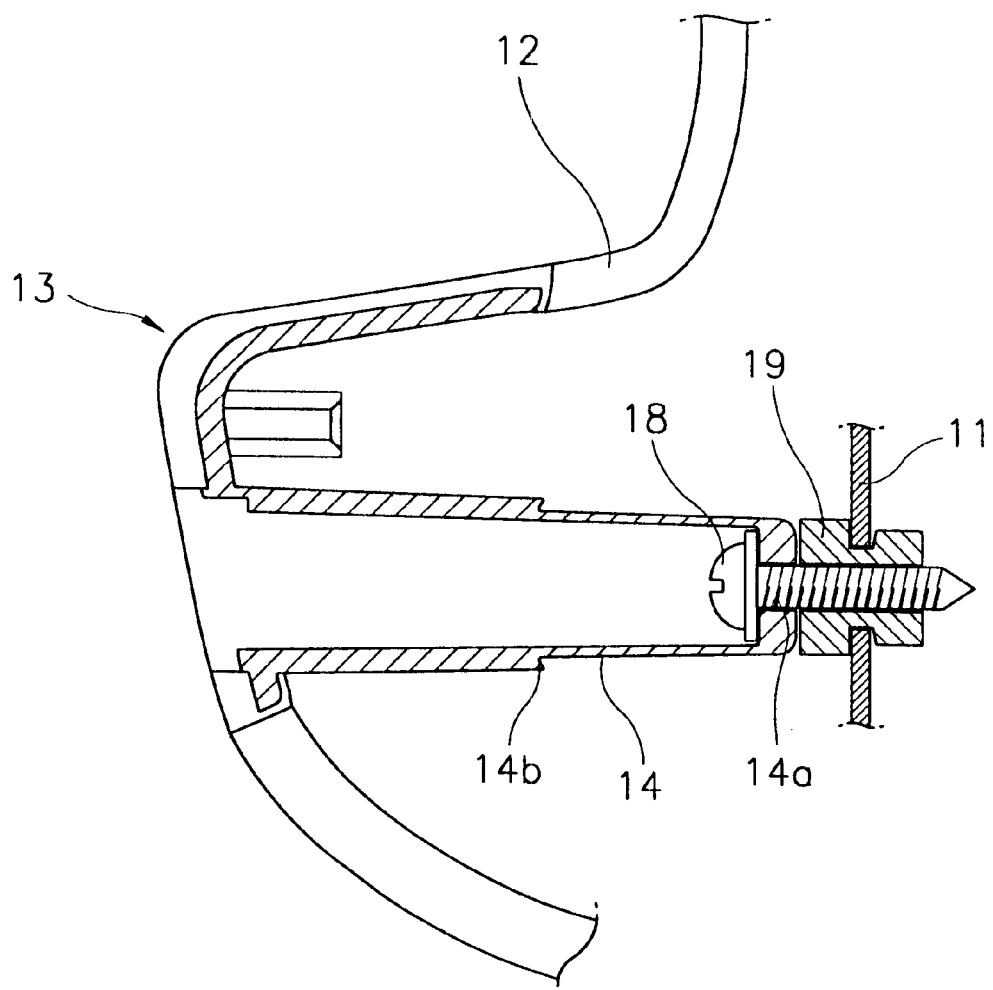
FIG. 4 is a sectional view taken along line B—B of FIG. 3 for illustrating a boss part of a handle attached to an inner panel of the door.

FIG. 3 is a perspective view for illustrating an automobile door according to a first embodiment of the present invention and FIG. 4 is a sectional view taken along line B—B of FIG. 3 for illustrating a boss part of a handle attached to an inner panel of the door wherein like reference numerals are used for designation of like or equivalent parts or portions as in FIG. 2 while reference numerals not designated will refer to those of FIG. 1.

As illustrated in the drawings, the door 10 is attached at an inner panel 11 thereof with a trim member 12 as interior material and a handle 13 protruded toward inside of the automobile is screwed to the trim member 12 for use in opening and closing the door 10.

The handle 13 is integrally mounted at both rear tip ends thereof with boss parts 14, each externally protruded at a predetermined length.

Furthermore, the boss part 14 is formed as a hollow cylinder with a hole 14 and is centrally mounted with a notch part 14b for making thin the thickness thereof. A screw 18 is inserted into the boss part 14 of the handle 13 to couple a retainer 19. The retainer 19 is fitted with the inner panel 11.

The notch 14b of the boss part 14 designed to weaken the structural strength of the boss part 14 and enables the boss part 14 of the handle 13 to be easily broken by the shock transmitted into the body of the automobile through the door 10 when the automobile is laterally crashed. In other words, the boss part 14 has the notch 14b having its thickness abruptly decreased, such that the boss part 14 is greatly weakened in its structural strength.

Figure 5:
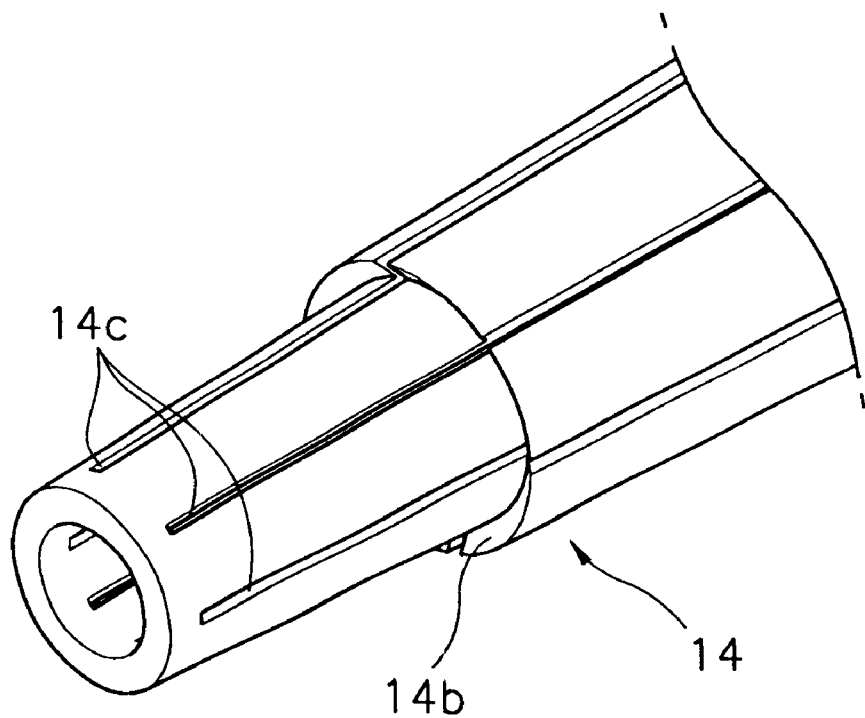
FIG. 5 is a perspective view for illustrating a boss part of door handle according to a second embodiment of the present invention.

Meanwhile, the boss part 14 at the handle 13 is circumferentially formed with a plurality of slots 14c cut out lengthwise to communicate therethrough, where the slots 14c are provided to weaken the structural strength of the boss part 14 along with the notch 14b, as illustrated in FIG. 5.

In other words, the boss part 14 integrally formed at the rear surface of the handle 13 for screwing the handle 13 to the inner panel 11 of the door 10 is formed with the notch 14b having its thickness abruptly decreased, or is integrally formed a slot 14c communicating therethrough lengthwise along with the notch 14b, such that the shock transmitted to the body of the automobile through the door deforms the inner panel 11 and is sent to the boss part 14 integrally formed at the rear surface of the handle 13 when the automobile is laterally crashed.

At this time, the boss part 14 mounted at the handle 13 is destructed at the notch 14b or at the slot 14c by the shock transmitted into the automobile, such that the handle 13 sends only a slight level of the shock in applying the shock to the side of the passenger to thereby improve the safety of the passenger.

It is therefore all right if the handle 13 equipped with the boss part 14 thus constructed is made with material of excellent structural strength to firmly secure the handle 13 to the inner panel 11 of the door 10, and safety of passengers can be increased via the boss part 14 which breaks via the notch 14b and the slot 14c when the automobile is laterally crashed.

As apparent from the foregoing, there is an advantage in the automobile door handle according to the present invention thus constructed in that a boss part integrally formed at the rear surface of the handle for fastening the handle to a door is constructed to provide durability and safety at the same time during side collision of the automobile, such that the two contradictory concepts of maintaining a mounted durability and ease of destruction thereof during the collision can be simultaneously satisfied in manufacturing the boss part of the handle.

What is claimed is:

1. An automobile door handle, the handle comprising: a handle part;

a boss part extending from the handle part and coupled to a door panel; and strength weakening means for weakening the structural strength of the boss part in order to break the boss part when shock of more than a predetermined size is applied to the boss part.

2. The handle as defined in claim 1, wherein the strength weakening means comprises a notch formed at a predetermined portion lengthwise along the boss part decreasing a thickness of the boss part.

3. The handle as defined in claim 1, wherein the boss part is formed with a plurality of slots extending lengthwise thereof, each formed at a predetermined space along a circumferential direction thereof.

4. The handle as defined in claim 1, wherein the boss part is a hollow cylinder.

* * * * *